Feb. 10, 1931.  A. J. CONLEY  1,791,714
COMBINED HARVESTER AND THRASHER
Filed Jan. 2, 1926  10 Sheets-Sheet 8
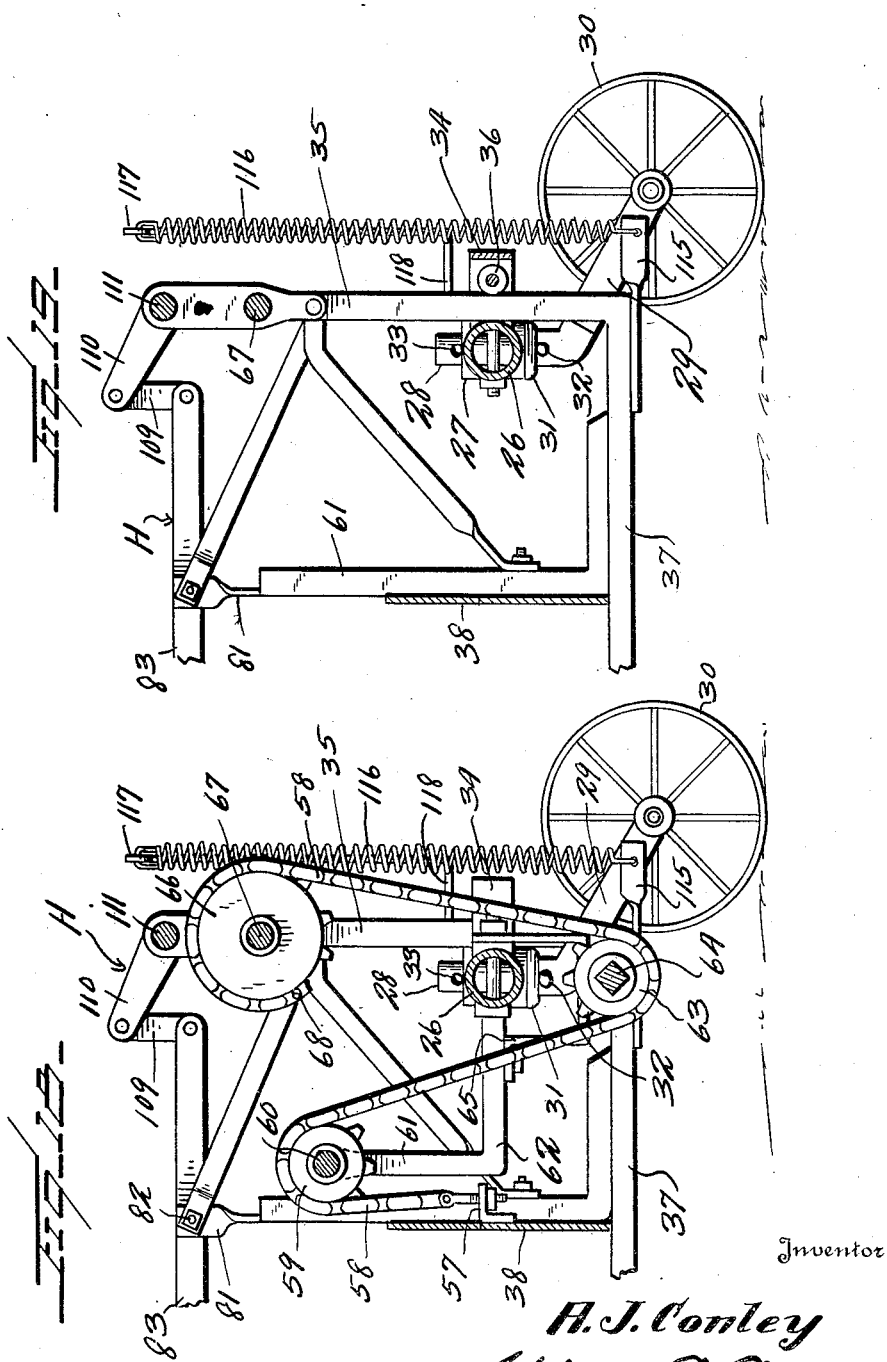

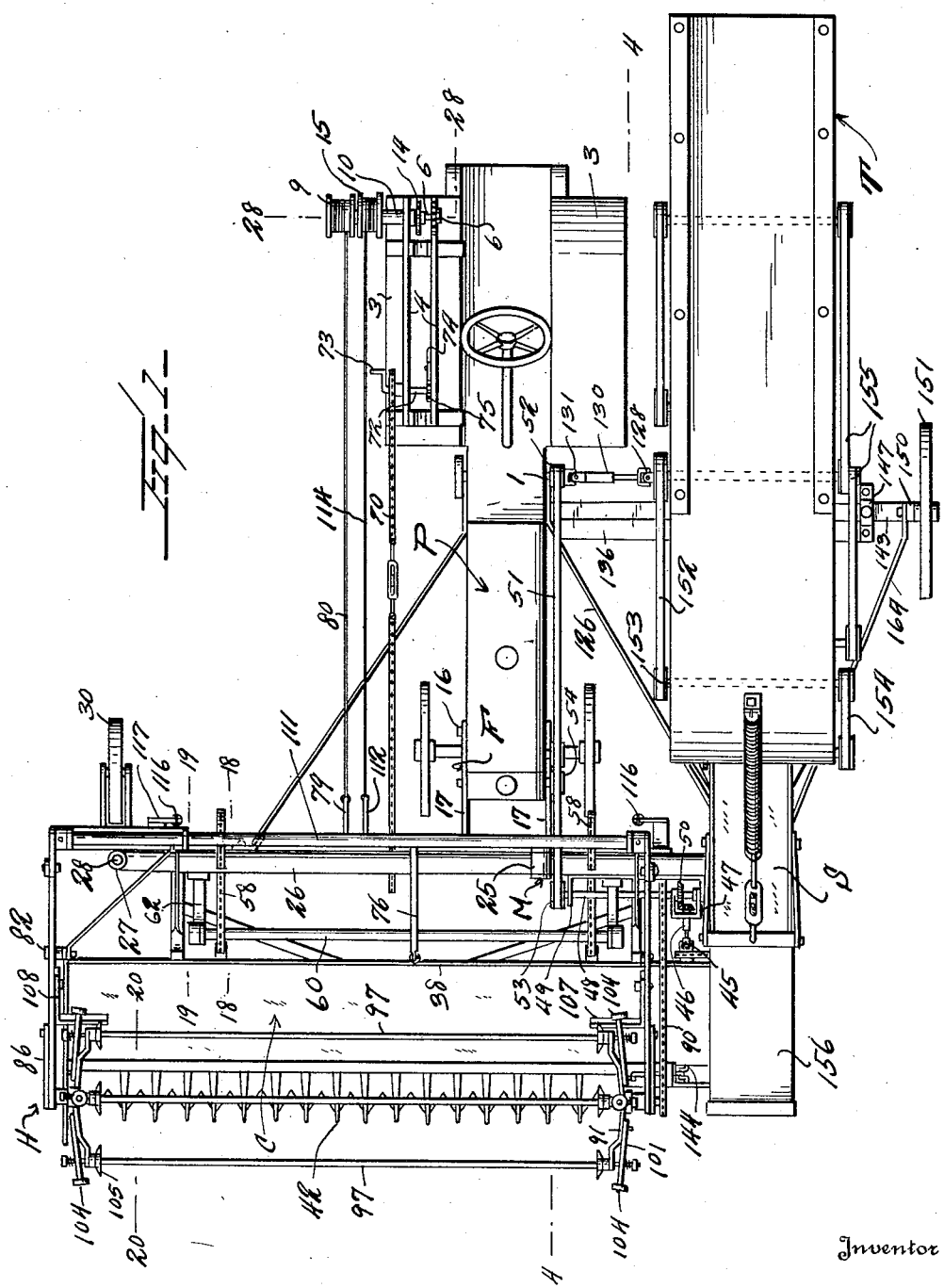

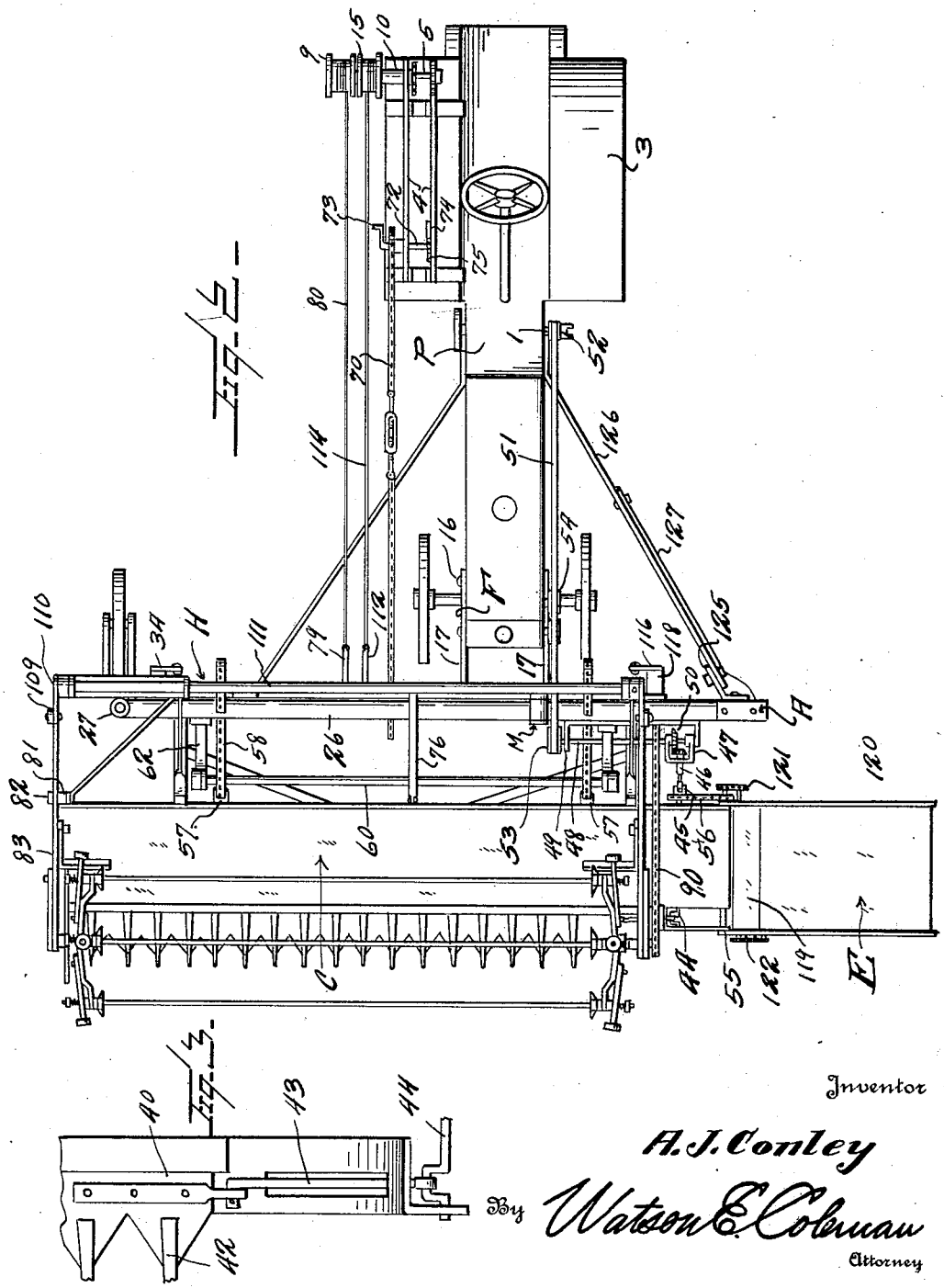

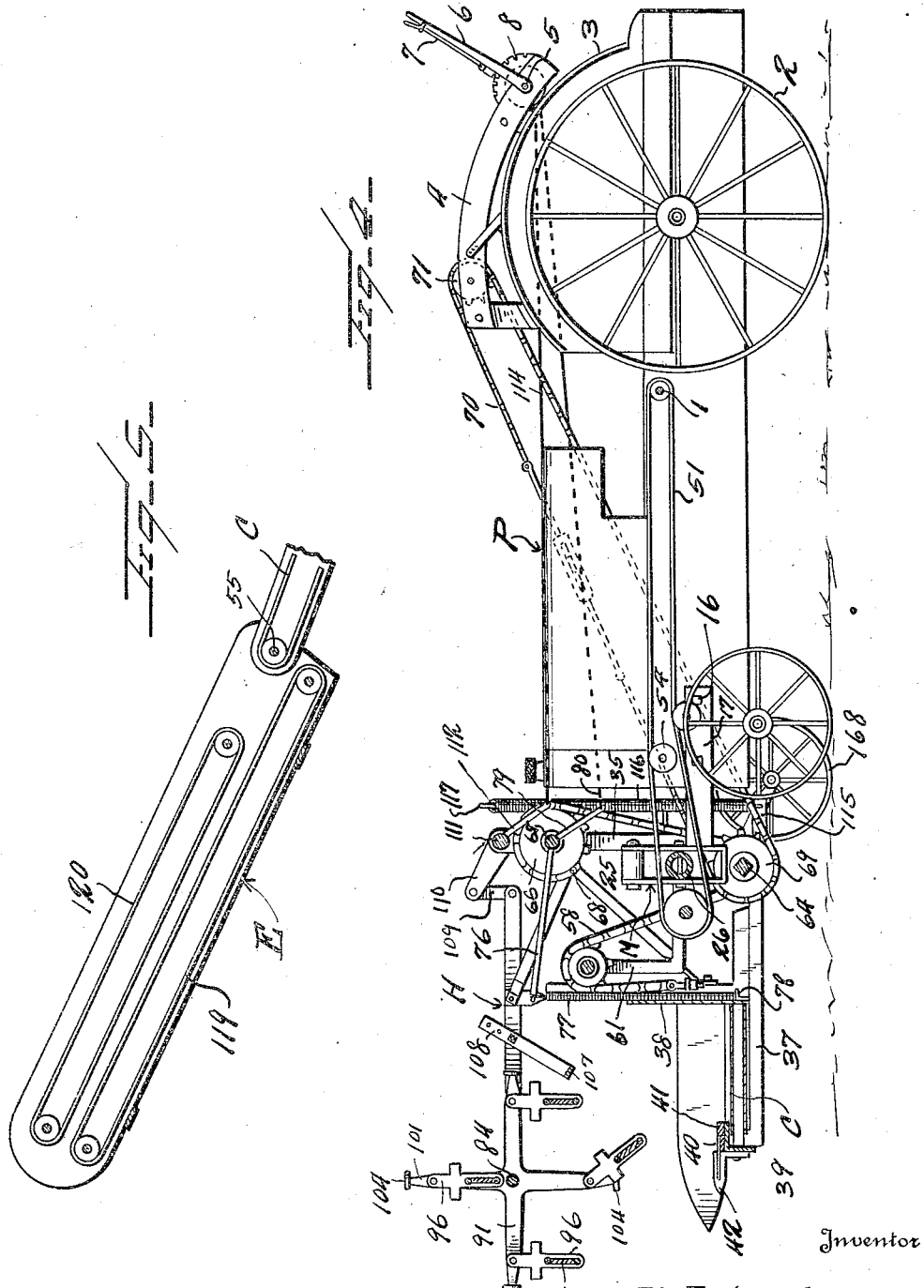

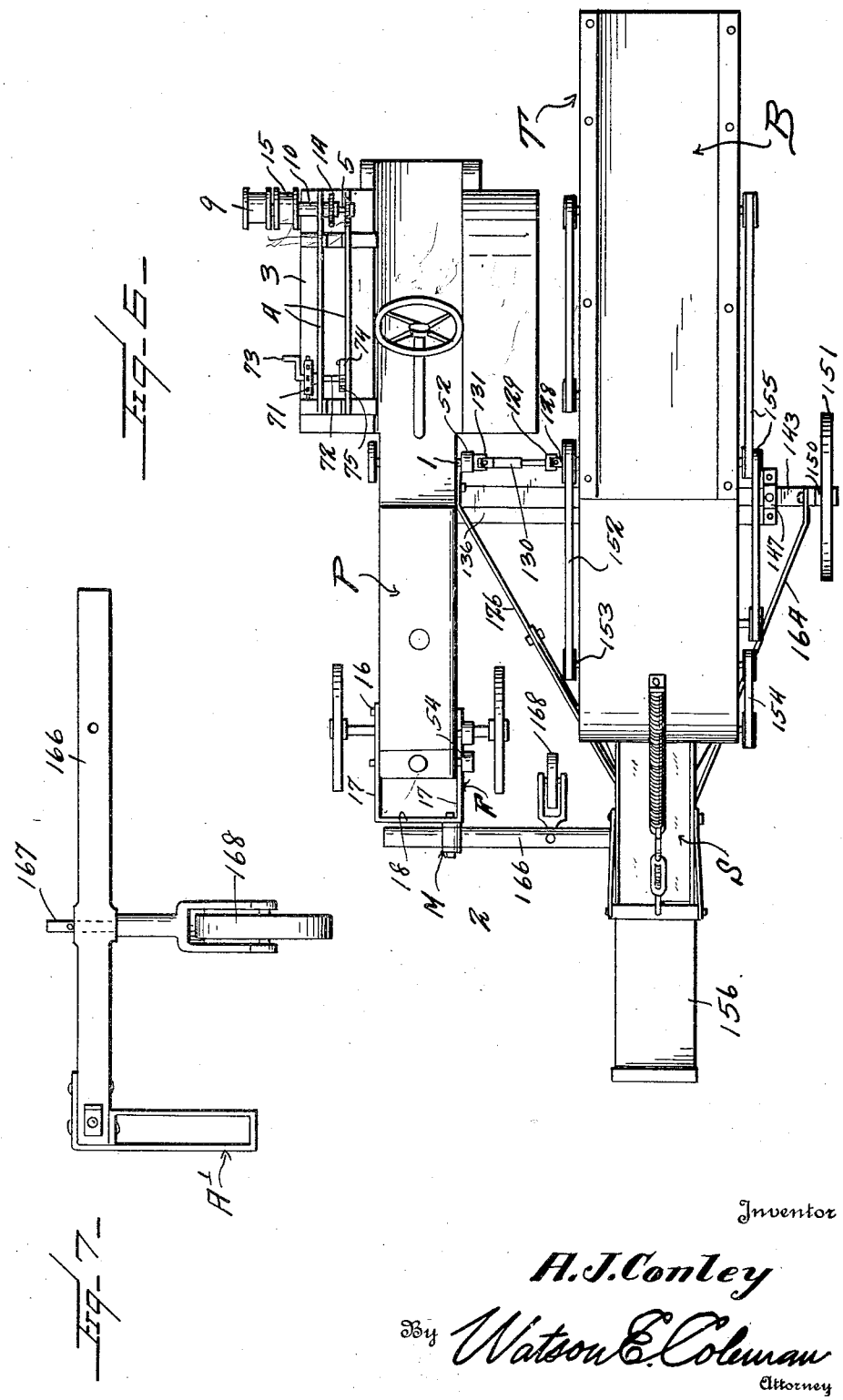

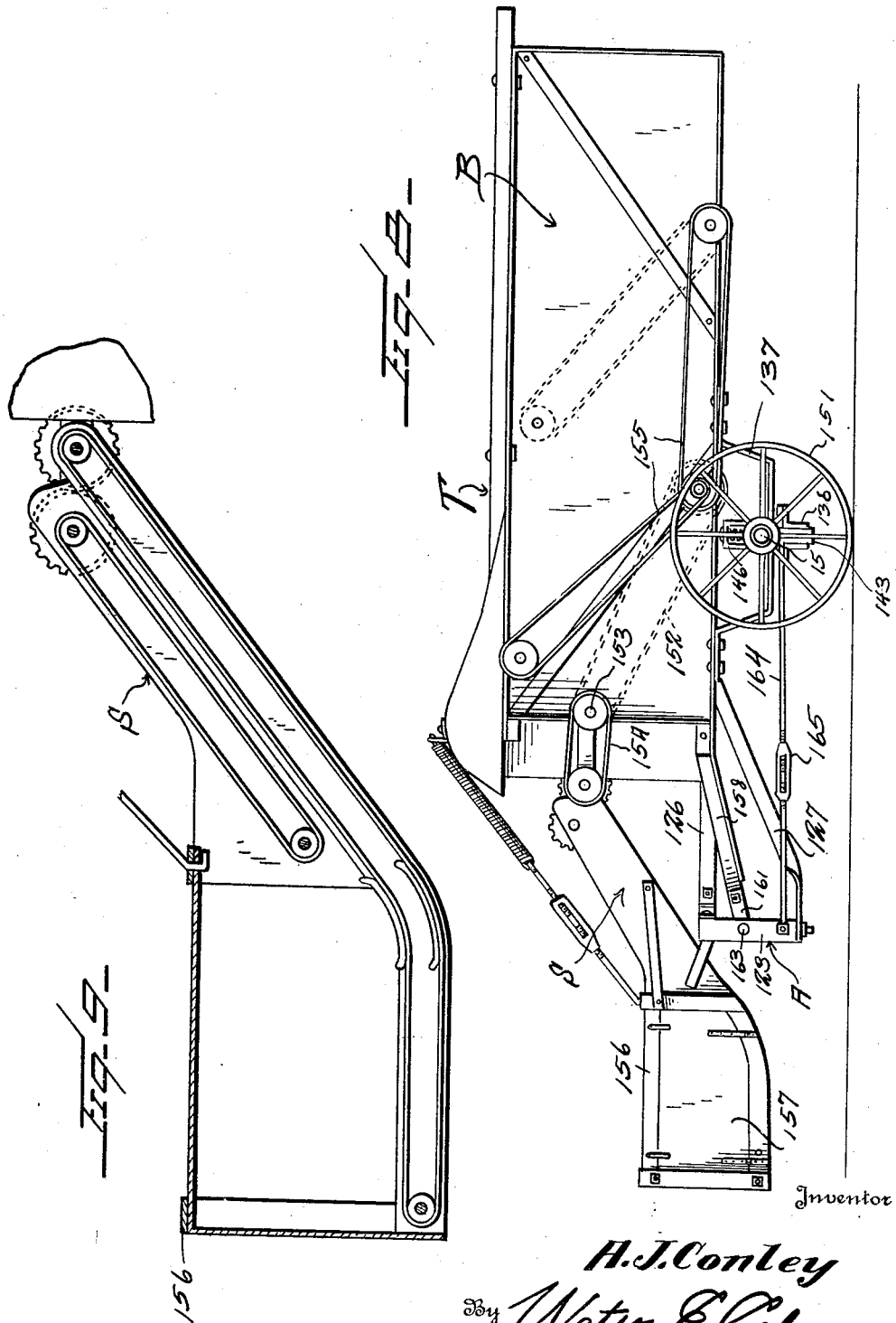

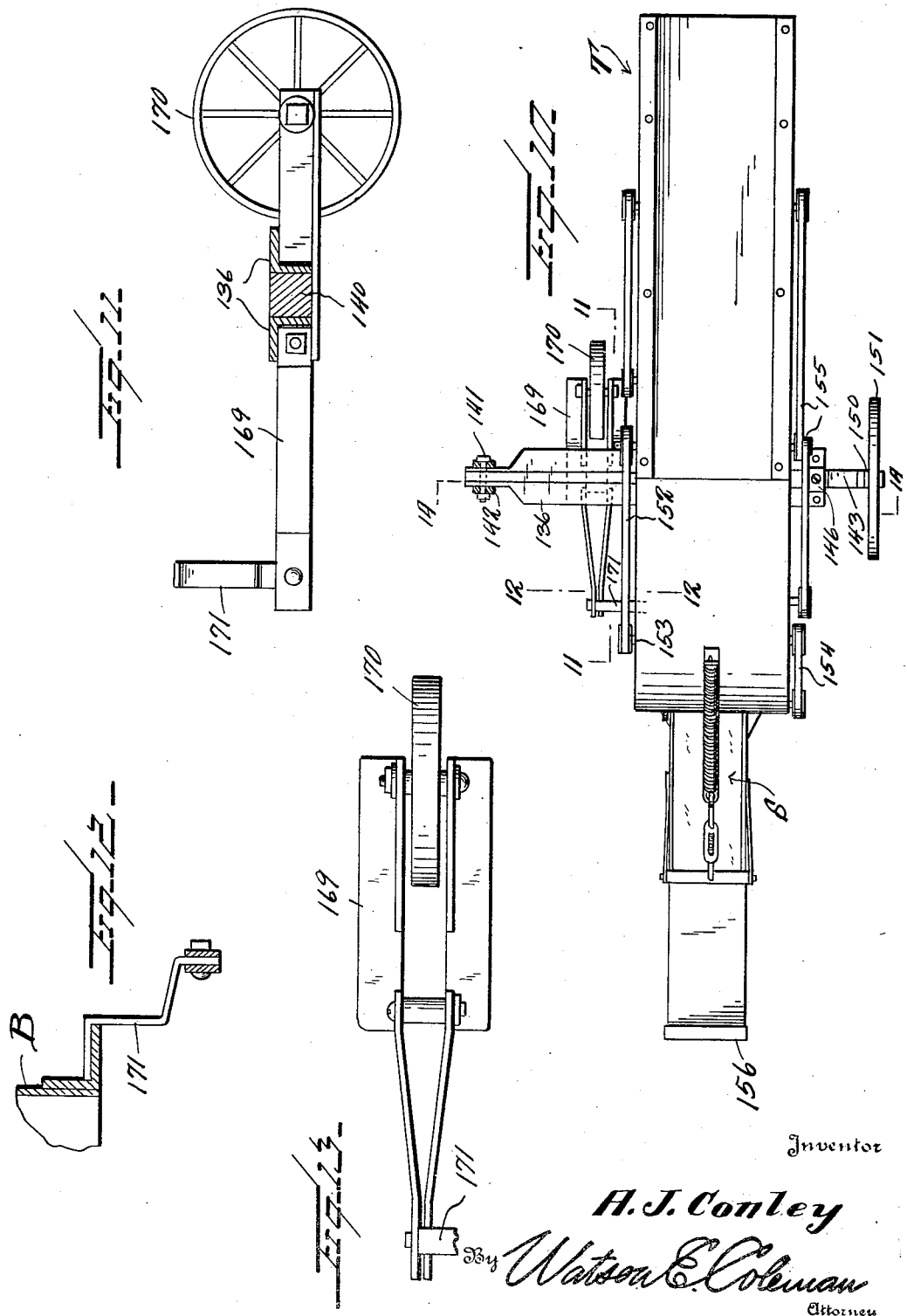

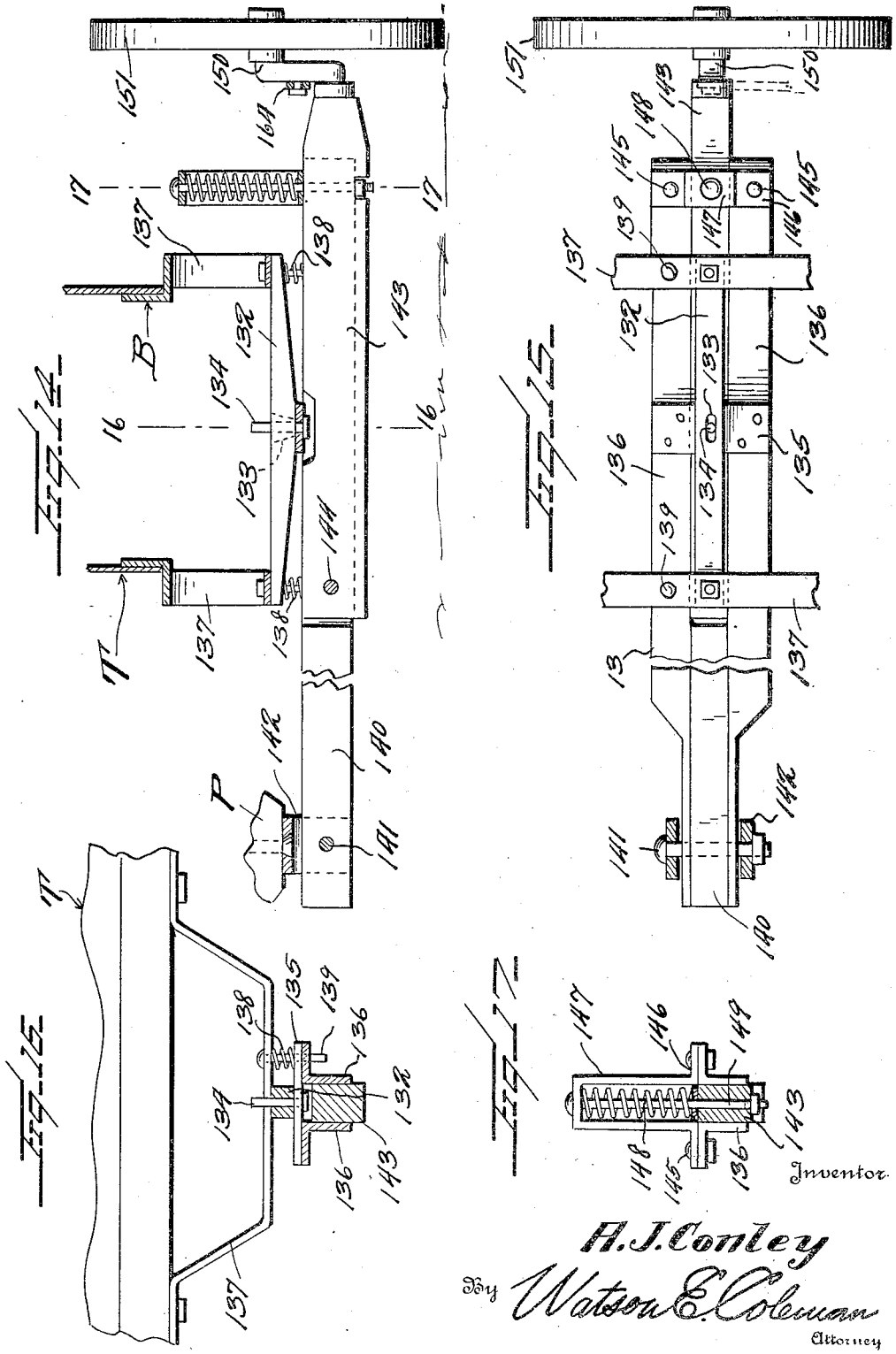

Feb. 10, 1931.  A. J. CONLEY  1,791,714
COMBINED HARVESTER AND THRASHER
Filed Jan. 2, 1926  10 Sheets-Sheet 9
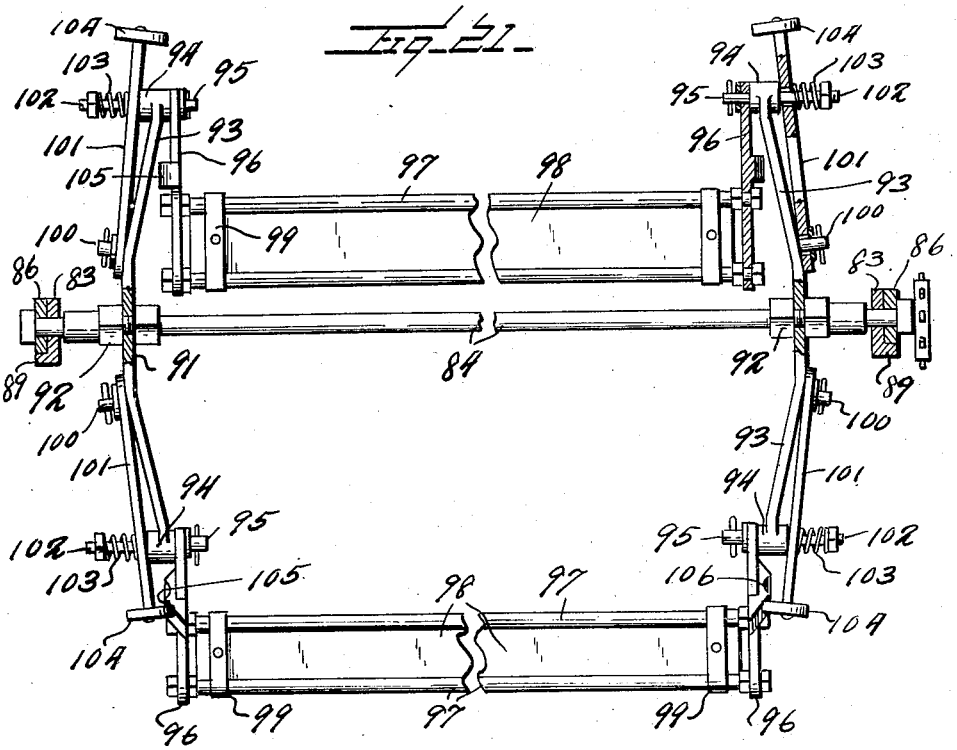
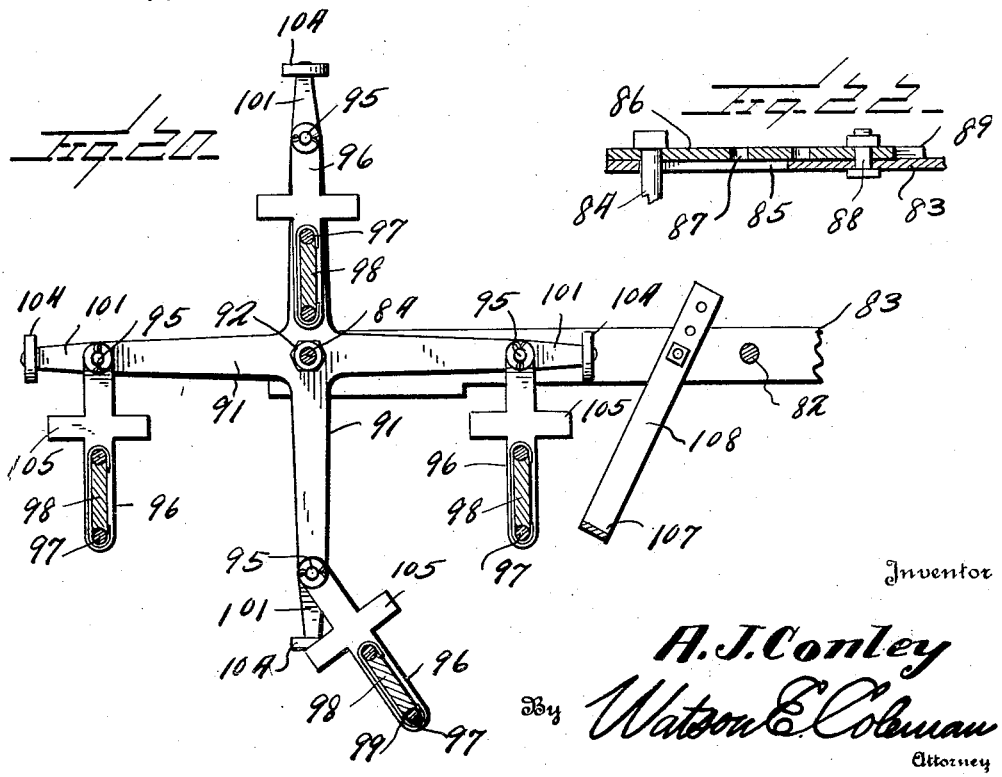
Inventor
A. J. Conley
By Watson E. Coleman
Attorney Feb. 10, 1931.  A. J. CONLEY  1,791,714
COMBINED HARVESTER AND THRASHER
Filed Jan. 2, 1926  10 Sheets-Sheet 10
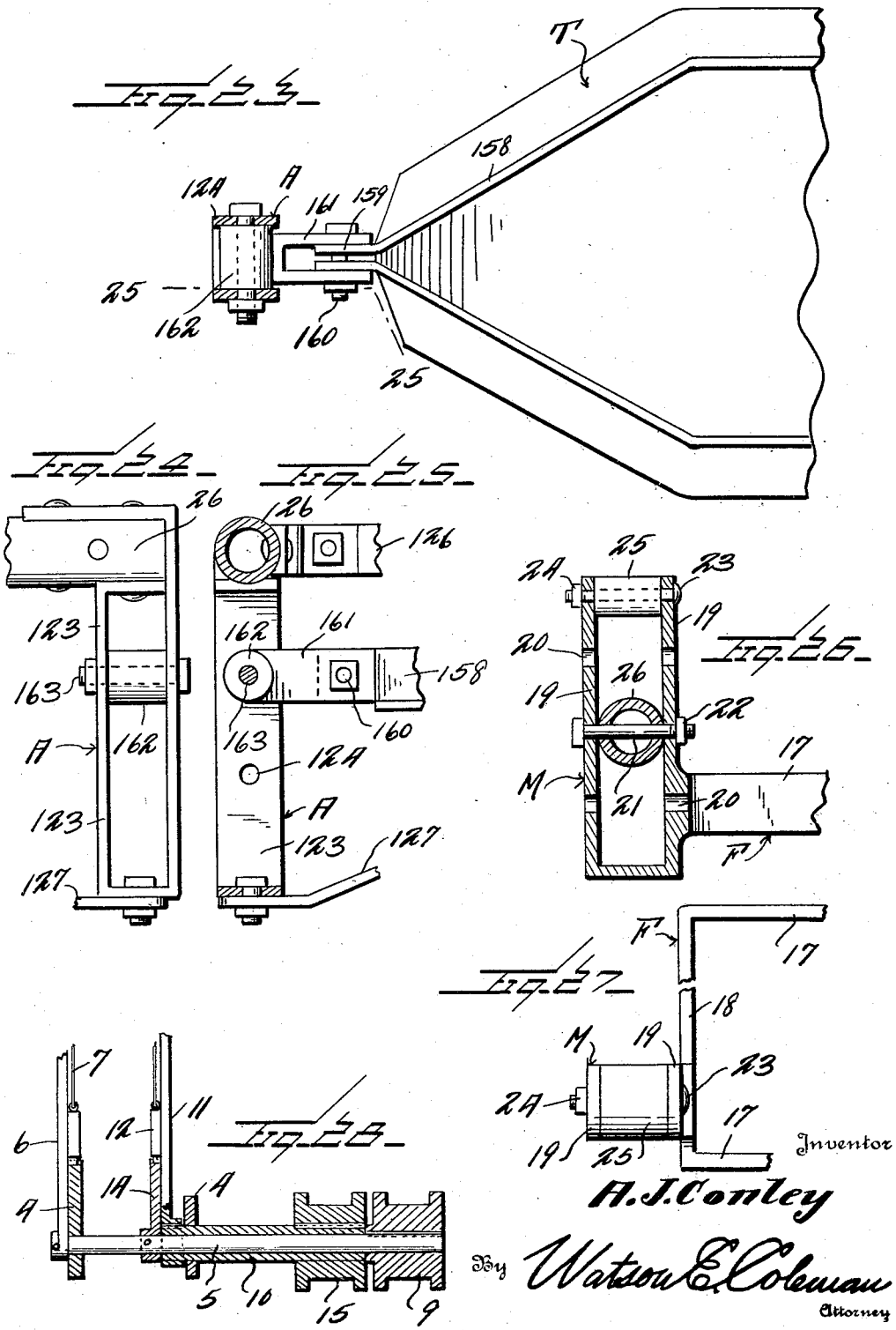

Patented Feb. 10, 1931

1,791,714

UNITED STATES PATENT OFFICE

ANDREW J. CONLEY, OF MELROSE, NEW MEXICO

COMBINED HARVESTER AND THRASHER

Application filed January 2, 1926. Serial No. 78,923.

This invention relates to a combined harvester and thrasher and it is primarily an object of the invention to provide a machine of this kind wherein the thrasher and harvester constitute separable units adapted to be associated either singly or collectively with a power unit.

Another object of the invention is to provide a machine comprising a power unit, a thrashing unit and a harvesting unit together with means whereby the thrashing unit and the harvesting unit may be operatively engaged with the power unit or either the thrashing unit or the harvesting unit separately employed in connection with the power unit.

A further object of the invention is to provide an agricultural machine of this kind embodying a thrashing unit and a harvesting unit adapted to be operatively engaged either singly or collectively with a power unit and in a manner whereby the weight of the thrashing unit or the harvesting unit or both is partially imposed directly upon the power unit whereby the draft of the assembled units is materially lessened and thereby facilitating the functioning of the assembled units.

An additional object of the invention is to provide an agricultural machine of this kind comprising a thrashing unit and a harvesting unit adapted to be operatively engaged with a power and tractive unit in a manner whereby is substantially eliminated the liability of side draft of the assembled units when in transit.

It is a still further object of the invention to provide an agricultural machine of this kind comprising a thrashing unit and a harvesting unit adapted to be operatively engaged with a power and tractive unit and in a manner whereby the assembled units are each capable of such relative movement to compensate for such inequalities as may occur on the surface over which the assembled units may traverse and more particularly to permit relative movement of the units in a direction transverse to the line of travel.

The invention also contemplates for an object to provide an agricultural machine of this kind comprising a thrashing unit and a harvesting unit adapted to be separately or collectively placed in operative connection with a power and tractive unit together with means whereby the various adjustable parts comprised in the harvesting mechanism, such as the thrashing structure and the reel, may be readily and conveniently controlled by the driver or other occupant of the power and tractive unit.

A purpose of the invention is also to provide an agricultural machine of this kind comprising a thrashing unit, a harvesting unit and a power unit together with means whereby in the complete assembly both the thrashing unit and the harvesting unit are operatively supported by the power and tractive unit and one by the other in order to assure an effective balance of the assembled units and to materially lessen the draft during transit.

A still further object of the invention is to provide an agricultural machine of this kind comprising a power and tractive unit, a thrashing unit and a harvesting unit together with means whereby the thrashing unit and the harvesting unit may be separately placed in operative connection with the power and tractive unit or collectively placed in such connection with the power unit and each other whereby both the thrashing unit and the harvesting unit may be employed in unison with the power and tractive unit or separately in connection with such power and tractive unit and also permitting the power and tractive unit to be employed independently of either the thrashing unit and the harvesting unit.

The invention also has for an object to provide a tractive unit provided with a power shaft together with a thrashing unit and a harvesting unit adapted to be either singly or collectively associated with the tractive unit with the working parts thereof driven directly from the power shaft of the tractive unit.

The invention consists in the details of construction and in the combination and arrangement of the several parts of my improved combined harvester and thrasher whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in top plan illustrating an agricultural machine constructed in accordance with an embodiment of my invention with both the thrashing unit and the harvesting unit in assembly with the power and tractive unit;

Figure 2 is a view in top plan showing the assembly with the power and tractive unit of only the harvesting mechanism;

Figure 3 is a fragmentary view in top plan illustrating a portion of the operating means for the cutting bar comprised in the harvesting unit;

Figure 4 is a sectional view taken substantially on the line 4—4 of Figure 1;

Figure 5 is an enlarged fragmentary view partly in section and partly in elevation of the conveyor associated with the harvesting mechanism in connection with the assembly illustrated in Figure 2;

Figure 6 is a view in top plan illustrating the assembly wherein the thrashing unit only is employed in connection with the tractive and power unit;

Figure 7 is an enlarged view in elevation of the hitch bar and associated parts for the forward portion of the thrashing unit employed in the assembly illustrated in Figure 6;

Figure 8 is a view in elevation of the outer side of the thrashing unit as herein employed;

Figure 9 is an enlarged fragmentary view partly in section and partly in elevation of a delivery mechanism employed in connection with the thrashing unit;

Figure 10 is a view in top plan of the thrashing unit detached with the supplemental supporting member in applied position;

Figure 11 is an enlarged sectional view taken substantially on the line 11—11 of Figure 10;

Figure 12 is an enlarged sectional view taken substantially on the line 12—12 of Figure 10;

Figure 13 is a view in top plan of the structure illustrated in Figure 11 with certain of the parts omitted;

Figure 14 is an enlarged sectional view taken substantially on the line 14—14 of Figure 10;

Figure 15 is a view in fragmentary top plan of the structure illustrated in Figure 14 with portions omitted;

Figure 16 is a fragmentary sectional view taken substantially on the line 16—16 of Figure 14;

Figure 17 is a detailed sectional view taken substantially on the line 17—17 of Figure 14;

Figure 18 is an enlarged sectional view taken substantially on the line 18—18 of Figure 1;

Figure 19 is an enlarged sectional view taken substantially on the line 19—19 of Figure 1;

Figure 20 is an enlarged sectional view taken substantially on the line 20—20 of Figure 1;

Figure 21 is an enlarged view partly in elevation and partly in section of the reel employed in connection with the harvesting unit as herein disclosed;

Figure 22 is an enlarged fragmentary view partly in section and partly in top plan illustrating an adjustable mounting for the reel;

Figure 23 is a fragmentary view partly in plan and partly in section illustrating a hitch for use in connection with the thrashing unit;

Figure 24 is a fragmentary view in elevation of a portion of the hitch illustrated in Figure 23;

Figure 25 is a sectional view taken substantially on the line 25—25 of Figure 23;

Figure 26 is an enlarged fragmentary view partly in section and partly in elevation illustrating the hitch as herein disclosed for use in connection with the tractive and power unit and the harvesting unit;

Figure 27 is a fragmentary view in top plan of the structure illustrated in Figure 26;

Figure 28 is a view partly in section and partly in elevation illustrating in detail the means herein disclosed carried by the tractive and power unit for manipulating the adjustable parts of the harvesting unit, such as the cutting mechanism and reel.

As disclosed in the accompanying drawings, P denotes a power and tractive unit which may comprise a tractor of any preferred type or design, except that it is provided at its central portion with a power shaft 1 disposed transversely thereof and extending beyond a side thereof. This shaft 1 is adapted to be operatively engaged with the motor of the unit P in any desired manner and as this particular mechanism in itself forms no part of the present invention it is not believed that a detailed description and illustration thereof is necessary.

As herein disclosed, the rear power wheels 2 of the unit P each has associated therewith in a well known manner a fender 3 and overlying one of said fenders 3 and supported thereby is a pair of elongated members 4 arranged side by side and in spaced relation. Disposed transversely of the members 4 and rotatably supported thereby is a shaft 5 to the inner end portion of which is fixed a lever 6 carrying a conventional latch mechanism 7 coacting with an arcuate rack 8 carried by the adjacent member 4.

The shaft 5 extends a desired distance beyond the outer or second member 4 and the outer extremity thereof has fixed thereto a pulley 9. The extended portion of the shaft 5 inwardly of the pulley 9 has freely mounted thereon an elongated sleeve 10 the inner end of which extends through the outer member 4 terminating a desired distance inwardly thereof. This inner end portion of the sleeve 10 has fixed thereto a lever 11 carrying a conventional latch mechanism 12 coacting with the rack 14 fixed to the shaft 5. The outer end portion of the sleeve 10 and immediately adjacent to the pulley 9 has fixed thereto a second pulley 15.

Upon operation of the lever 6, the pulleys 9 and 15 will be caused to rotate in unison as the sleeve 10 is normally locked for rotation with the shaft 5 by coaction between the latch mechanism 12 carried by the lever 11 and the rack 14. Upon operation of the lever 11, however, the pulley 15 will be caused to rotate independently of the pulley 9. The purposes of these pulleys 9 and 15 and their independent operation will be hereinafter set forth.

The forward portion of the body or frame of the unit P is adapted to have bolted, as at 16, or otherwise affixed thereto the side arms 17 of a substantially U-shaped frame F, the intermediate member 18 of which being forwardly disposed and in advance of the body or frame of the unit P when in applied position. The member 18 of the frame F closely adjacent to an end thereof is provided with a vertically disposed hitch member M herein disclosed as U-shaped in form with its side arms 19 spaced apart in a direction lengthwise of the unit P when the frame F is in applied position. The arms 19 are provided with the vertically spaced openings 20, an opening of each arm 19 being aligned with an opening in the second arm 19.

A coupling pin or member 21 is adapted to be selectively disposed through a pair of aligned openings 20 and held against displacement by a nut 22 or otherwise as may be preferred. The upper portions of the arms 19 of the member M also have disposed therethrough a bolt 23 held in applied position by the nut 24 or the like. Surrounding the bolt 23 and interposed between the upper portions of the arms 19 of the member M is a spacer sleeve 25 which may be readily removed upon withdrawal of the bolt 23.

The harvesting unit H comprises an elongated bar or head member 26 having one end portion received between the arms 19 of the member M and through which the pin or member 21 is disposed, as particularly illustrated in Figure 26, whereby the bar or head 26 is operatively connected to the unit P for vertical swinging movement about the pin 21. When so engaged, the bar or head 26 is in advance of the unit P and extends transversely thereof and beyond opposite sides. It is also to be particularly noted that the engagement of the pin 21 with the bar or head 26 is to one side of the longitudinal center thereof.

The end portion of the bar or member 26 remote from the member M is provided with a vertically disposed bearing 27 through which is freely disposed from below the shank 28 carried by the fork 29 for the caster wheel 30, said fork 29 and shank 28 being angularly related as particularly illustrated in Figures 18 and 19 so that the wheel 30 rotatably carried by the fork 29, in addition to providing an effective support for the adjacent end portion of the bar or head 26, will readily trail when the assembled units P and H are in transit and especially when changing the course of travel.

Underlying the bearing 27 is a washer 31 with which the bearing contacts from above and said washer is held against downward movement by a pin 32 or the like selectively disposed through one of the longitudinally spaced openings 33 in the shank 28. By this means, the wheel 30 may be adjusted with respect to the bar or head 26 and in accordance with the adjustment of the connection of the bar or head 26 with the hitch member M.

The bar or head 26 in relatively close proximity to its opposite ends is provided with the rearwardly directed brackets 34 through each of which is slidably disposed a vertically directed post 35 the rear edge of which having contact with a roller 36 rotatably mounted within the bracket so that said post may have requisite vertical movement through the bracket with a minimum of frictional resistance.

The lower end portion of each of the posts 35 is provided with a forwardly extending elongated member 37 which provides a mounting and support for the platform conveyor C. The members 37 also support the grain board 38 of the conveyor C while the outer end portion of each of said members 37 supports an angle iron 39 upon which is mounted for rectilinear movement the sickle bar 40. The rear marginal portion of this bar 40 abuts a guiding member 41. The sickle bar 40 works in a well known manner through the guard fingers 42 projecting forwardly from the angle iron 39. As particularly illustrated in Figure 3, the sickle bar 40 is operated by a pitman 43 operatively engaged with an end portion of the bar and also with a crank shaft 44. This crank shaft 44 is disposed transversely of the platform and supported in any conventional manner and has its inner end portion in universal connection, as at 45, with a shaft 46. This shaft 46 is of a structure to be readily extended or retracted and is rotatably supported at one end portion by a bearing 47 carried by a shaft 48. This shaft 48 is rotatably held by the bearings 49 extending forwardly from the bar or head 26 and to one side of the unit P when in assembly with the harvesting unit H. These bearings 49 are also carried by the shorter length of the bar or head 26 to one side of its pivotal mounting with the hitch member M.

The shafts 46 and 48 are operatively connected by the gears 50 and the inner portion of the shaft 48 is in driven connection with the power shaft 1, such connection being herein disclosed as an endless belt 51 disposed around a pulley 52 fixed to said shaft 1 and a second pulley 53 fixed to the inner end portion of the shaft 48. The stretches of the belt 51 are each disposed over a guide pulley 54 supported by the adjacent side portion of the unit P.

The conveyor C is of an endless type and is operatively engaged, as is well known, with a shaft 55 disposed transversely of the platform and said shaft 55 is in driven connection with the shaft 44 through the medium of the endless chain 56 or other equivalent means.

The grain board 38 adjacent to its opposite ends is provided with the inwardly directed brackets 57 to each of which is connected an end portion of a flexible member or chain 58. This chain extends upwardly from the bracket and passes over a sprocket wheel 59 carried by the shaft 60. This shaft 60 is supported by the uprights 61 arranged at the outer ends of the forwardly directed arms 62 carried by the bar or head 26.

The flexible member 58 passes downwardly from the sprocket 59 and around from below a sprocket wheel 63 fixed to a shaft 64 each end portion of which being rotatably supported by a bearing 65 depending from the arms 62 and the adjacent portion of the bar or head 26. The chain 58 passes upwardly from the sprocket 63 to a sprocket 66 carried by a shaft 67 rotatably supported by the upper portions of the posts 35. The chain 58 is suitably fixed, as at 68, to the sprocket 66.

The shaft 64 has properly positioned thereon a sprocket wheel 69 with which is operatively engaged a sprocket chain 70. This chain is also adapted to be operatively engaged with a sprocket 71 carried by the shaft 72 rotatably supported by the members 4 hereinbefore referred to. This shaft 72 is adapted to be manually operated by the crank 73 or the like and is normally held against rotation in one direction by the pawls 74 carried by one of said members 4 and coacting with a ratchet wheel 75 fixed to the shaft 72.

Upon requisite rotation of the shaft 72 the shaft through the medium of the chain 70 will cause similar rotation of the shaft 64 in raising or lowering of the posts 35 and the parts supported thereby as the occasions of practice may necessitate. The chains 58 also operate to cause the platform during such raising or lowering movement to be maintained in its normal substantially horizontal position.

The raising of the posts 35 and the parts supported thereby is for the purpose of obtaining an initial positioning of the sickle bar in accordance with the character of the grain to be cut and such adjustment is generally effected before starting a working operation.

Fixed to and extending forwardly from the shaft 67 at a point adjacent its longitudinal center is an arm 76 to the outer end portion of which is engaged an extremity of the retractile spring 77, said spring extending downwardly and secured at its opposite end portion to an outstanding bracket 78 carried by the lower portion of the grain board 38. This spring is of a tension to constantly urge the arms 76 downwardly and thereby maintaining the flexible member or chain 58 under tension at all times and to facilitate the requisite balancing of the platform and the parts carried thereby.

The shaft 67 is also provided at a desired point thereon with a downwardly and rearwardly disposed rock arm 79 to the lower or free end portion of which is attached an end portion of a flexible member 80, said member extending rearwardly and being secured to and wound upon the drum 9 hereinbefore referred to so that when the shaft 5 is rotated in one direction upon proper manipulation of the lever 6, the forward portion of the platform will be caused to tilt. This tilting action results from the fact that as pull is imposed upon the rock arm 79 the shaft 67 will be partially rotated causing the chain 58 to further wind upon the sprocket 66 resulting in said chain 58 imposing pull upon the rear portion of the platform through its connection by the bracket 57 with the grain board 38. Upon movement of the lever 6 in the opposite direction the forward portion of the platform and the parts carried thereby will, by gravity, return to their normal lowered position.

Each of the uprights 61 is provided with an upstanding arm 81 with which is pivotally connected, as at 82, for vertical swinging movement a forwardly directed elongated arm 83 with the forward end portion of which is operatively engaged a reel shaft 84. The forward portion of this arm 83 is provided with a longitudinally disposed slot 85 through which an end portion of the reel shaft 84 is disposed for direct operative engagement with an elongated plate 86. This plate 86 is provided with a series of longitudinally spaced openings 87 through which is adapted to be selectively disposed a bolt 88 also directed through the arm 83 inwardly of the slot 85 whereby the plate 86 may be longitudinally adjusted in order to position the reel shaft 84 in varying positions with respect to the sickle bar 40. The adjacent portion of the arm 83 is provided in its lower margin with an outstanding flange 89 upon which the plate 86 rests to further assure its proper maintenance in applied or working position.

One end of the reel shaft is in driven connection with the shaft 48 preferably through the medium of the sprocket chain 90. Fixed to the shaft 84 adjacent to the ends thereof are the hubs 91 held in applied position upon the shaft by the holding nuts 92. Radiating from each of the hubs 91 are the arms 93 having their outer end portions disposed on an inward incline and terminating in the bearings 94. Disposed through each of the bearings 94 is a rod 95 extending beyond opposite end portions of the bearing 94, and the inner portion of the rod 95 provides a mounting for a freely swinging arm 96. Each of the arms 96 associated with one hub 91 is connected with an arm 96 of the second set by the parallel rods 97 and interposed and snugly fitting between the rods 97 is a slat 98. The slat 98 is held to the rods 97 by clips 99 or the like. Each set of rods 97 and the associated slat 98 are of sufficient weight to maintain the arms 96 substantially vertical during the period the rods 97 and slat 98 are traveling downwardly within the standing grain whereby such grain is held in most effective position with respect to the cutting mechanism during the cutting action of the sickle bar 40 on the grain and to maintain the standing grain in such position without a forcible throwing of the severed grain rearwardly upon a conveyor or platform C.

Each of the arms 93 has engaged therewith, as at 100, for swinging movement an arm 101 of a length to extend outwardly of the adjacent arm 93. The outer extended portion of the adjacent rod 95 is freely disposed through the outer portion of the arm 101 and interposed between said arm 101 and an enlargement 102 carried by the outer extremity of said extended portion is an expansible member 103, herein disclosed as a coil spring encircling the outwardly extended portion of the rod 95. This expansible member or spring 103 serves constantly to maintain the arm 101 at the limit of its movement toward the arm 93.

Rotatably supported by the outer end portion of each of the arms 101 is a circular head or disc 104 and extending outwardly from the adjacent arm 96 inwardly of the rods 97 is a transversely disposed outstanding block 105, the opposite end portions of which being outwardly and inwardly beveled with the central or high point of the block provided with a depression 106. The disc 104 is adapted to contact with the block 105 just before the adjacent arm 96 reaches its lowermost position whereby said arm together with the rods 97 and slat 98 are maintained rigid during the period the same pass over the major portion of the cutting mechanism. This is of particular advantage in assuring the requisite holding of the standing grain and to assure the desired delivery of the severed grain to the conveyor C. As the resistance is imposed to the rods 97 and slat 98 by the standing grain, the disc or head 104 may be forced to the central or high portion of the coacting block 105 but the arm 96 is held against passing beyond the center entry of the disc or head 104 within the depression 106.

As the reel continues to rotate, the arm 96 is brought into contact with an angular extension 107 carried by the lower end portion of a strip 108 depending from the elongated arm 83 and adjustably connected therewith as particularly illustrated in Figure 20. This contact will result in the arm 96 or particularly the block 105 carried thereby being freed from the disc or head 104 whereby said arm 96 is returned to its free swinging arrangement.

Each of the arms 83 extends inwardly of its pivotal mounting 82 and said inner portion has pivotally connecting therewith a link 109 which is also in pivotal connection with a rock arm 110 carried by the shaft 111. This shaft 111 is supported by the posts 35 above the shaft 67. This shaft 111 is provided with a rock arm 112 to which is secured an extremity of a flexible member 114 which is adapted to be secured to and wound upon the drum 15 so that when the sleeve 10 is rotated independently of the shaft 5, swinging movement will be imposed upon the arms 83 to adjust the reel proper with respect to the cutting mechanism.

Extending rearwardly from the lower end of each of the posts 35 is a bracket 115 to which is secured an extremity of a retractile spring 116. This spring is vertically disposed and has its upper end secured to the upper portion of a vertically disposed post 117. The lower portion of this post 117 is provided with a forward extension 118 which is suitably anchored to the bar or head 26. The springs 116 operate to further maintain the harvesting unit H in desired balanced assembly and particularly to maintain the forward portion of the platform at the extent of its downward swinging or tilting movement.

With the harvesting unit H in assembled arrangement with the power and tractive unit P, it will be readily understood that the requisite tilting of the platform and the desired adjustment of the reel may be effected by the driver or other occupant of the unit P upon proper manipulation of either the levers 6 or 11.

It will also be understood that the connection of the bar or head 26 with the hitch member M is such to permit the harvesting unit H and the power and tractive unit P to have lateral movement one independently of the other and which is of particular import when the assembly of such units H and P is in transit in order to readily compensate for any inequalities which may be encountered in the surface over which such assembly may be traveling.

When the harvesting unit alone is employed in connection with the power and tractive unit P, an elevating mechanism E is employed and which is operatively engaged with the platform structure in a conventional manner. This elevator structure is adapted to deliver in a well known manner upon a barge trailing the assembled units H and P while in transit. This elevator mechanism E comprises the overlying endless aprons 119 and 120, the apron 119 being in driven connection, as at 121, with the shaft 55 while the apron 120 is driven by the gears 122. It is to be understood that this elevator mechanism E is of a type that can be applied or removed within a comparatively short period of time.

Secured to and depending from the end portion of the bar or head 26, nearest to its connection with the hitch member M, is an oblong hitch member A the vertical side members 123 of which being provided with the vertically spaced openings 124 for a purpose to be hereinafter referred to. Extending rearwardly from the extremity of the bar or head 26 immediately adjacent to the upper portion of this member A is a bracket 125 to which is secured an end portion of a brace member 126 which, when the unit H is in assembly with the unit P, is also attached to said unit P at a point substantially midway thereof. Coacting with this brace member 126 and the lower portion of the member A is a supplemental brace member 127.

When it is desired to disengage the harvesting unit H from the unit P, the end portion of said unit H is preferably rested upon suitable props before the units are separated so that the unit H when not in use will be maintained in substantially a horizontal position.

The thrashing unit T may be of any desired general type except that the drive shaft 128 therefor extends transversely of the body of the machine and beyond opposite sides thereof. When the unit T is in assembly with respect to the unit P, said units are side by side as particularly illustrated in Figures 1 and 6 of the accompanying drawings and an extended portion of the shaft 128 has in universal connection therewith, as at 128, an end portion of a shaft 130, the opposite end portion of said shaft being in universal connection, as at 131, with the power shaft 1 of the unit P. This shaft 130 is of an expansible and retractible type.

The body B of the unit T at a point in relatively close proximity to its forward end is mounted upon a bolster 132 extending transversely of the body B. This bolster at its longitudinal center is provided with an opening 133 through which is disposed an upstanding pin 134 carried by a plate 135 and this plate 135 is secured to and bridges the space between the parallel members 136 comprised in an axle section. The extremities of the bolster 132 are engaged with the body B of the unit T through the depending frames 137 extending lengthwise of the body B and interposed between each of these frames 137 and a member 136 of the axle section is an expansible member 138, herein disclosed as a coil spring encircling a shank 139 depending from the frame and freely disposed through a member 136. Through the medium of the bolster 132 and in view of the fact that the opening 133 therein is gradually increased upwardly in a direction lengthwise of the bolster, the body B is supported for limited lateral swinging movement to compensate for the shocks and jars incident to use but said body is normally maintained in substantially a horizontal position through the instrumentality of the springs 138.

Between the inner portions of the members 136 is arranged a filler member 140 and the extremity of said inner portion is adapted to be pivotally connected, as at 141, by a removable pivot member with a bracket 142 depending from the central portion of the unit P.

Extending between the outer portions of the members 136 is a second axle section 143 which extends beyond the outer end of said members 136 and has its inner portion supported by said members by the pivot bolt 144 arranged in close proximity to the inner end of the filler member 140. The outer end portions of the members 136 have secured thereto, as at 145, the extremities of an inverted U-shaped member 146 between the side arms 147 of which the outer portion of the axle section 143 is adapted to move. The outer end portion of the axle section 143, however, is normally maintained against upward movement by an expansible member 148 interposed between the axle section 143 and the top of the member 146 and which encircles a vertically disposed bolt 149 secured to the outer portion of the axle section 143 and freely disposed through the upper or top part of the member 146.

The outer end of the axle section 143 is provided with an upwardly offset spindle 150 upon which is mounted a ground engaging and supporting wheel 151. By providing the pivotally connected axle sections and having one of such sections pivotally connected to the power unit P, the units P and T are permitted to have lateral movement one with respect to the other and thereby compensate for any inequalities in the surface over which the assembled units may traverse and thereby relieving the same of the undue strain which would be imposed one upon the other.

It is to be further noted that the arrangement of the axle upon which the body B is mounted is such that a considerable portion of the weight of the thrashing unit T is imposed directly upon the tractive and power unit P and thereby considerably reducing the draft.

As herein disclosed, 152 denotes a drive connection between the shaft 128 and the shaft 153 for the cylinder comprised in the thrashing unit T. Said cylinder is rotated free of the other movable parts of the thrashing mechanism except the elevating structure S associated with the unit T which alone is driven, as indicated at 154, from the cylinder. The other movable parts of the thrashing mechanism are driven by the outer extended portion of the drive shaft 128, as indicated at 155.

The elevator structure S is of a conventional type and is provided at its lower portion with the box 156 to receive the grain to be carried into the thrashing unit for desired separation. The sides of this box are open but the outer side is adapted to be closed by the door 157 as particularly illustrated in Figure 8 of the drawings.

The frame of the unit T at its forward end is extended, as at 158, and is provided with the forwardly directed bars 159 with which is engaged by the bolt 160 or the like a clevis 161. The outer portion of this clevis 161 carries a barrel or sleeve 162 which is adapted to be snugly received between the side members 123 of the hitch member A when all three of the units P, H and T are in assembly. Disposed through the sleeve or barrel 162 and selectively through the openings 124 in the side members 123 is the coupling pin or bolt 163. By this means, it will be noted that the adjacent end portions of the units T and H will be in pivotal connection one with the other and in a manner whereby said adjacent end portions of the units H and T are connected to maintain the same in such balance to assure the substantial elimination of side draft when the complete assemblage is in transit.

When the unit T is comprised in the same assembly with the units P and H, as particularly illustrated in Figure 1, the elevator mechanism E is omitted and the conveyor C comprised within the harvesting unit H delivers directly within the box 156 of the unit T through the inner open side thereof. From the box 156 the grain as delivered therein is carried within the body B of the thrashing unit T by the elevator structure S. While this structure S may be as desired I find it of advantage to employ the type as particularly illustrated in Figure 9 of the drawings.

Interposed between the lower portion of the hitch member A and the inner portion of the spindle 150 is a brace rod 164 particularly illustrated in Figure 8. This rod 164, as herein disclosed, comprises separable sections having adjacent end portions connected by a conventional turnbuckle 165.

When the unit T alone is employed with the power and tractive unit P, the elongated bar 166 is employed in lieu of the bar or head 26 and one end portion is pivotally engaged with the hitch member M by the coupling pin or bolt 21. The outer end of this bar 166 is provided with a depending hitch member A' similar to the hitch member A hereinbefore referred to and with which the barrel or sleeve 162 is operatively engaged as hereinbefore set forth with respect to the hitch member A. The bar 166 at a point substantially midway of its connection with the hitch member M and the hitch member A' has operatively engaged therewith the shank 167 of the caster wheel 168 adapted to traverse the ground and which provides additional support for the bar 166 to compensate for the weight of the unit T imposed thereon.

When the unit T is to be separated from the unit P, the truck 169 is placed below the members 136 and 140 outwardly of the pivoted end portion of the axle section 143 as particularly illustrated in Figure 1, one end of said truck 169 being provided with a ground engaging wheel 170 while the opposite end portion is provided with an upstanding angular bracket 171 adapted to engage from below as particularly illustrated in Figure 12 a side marginal flange of the body B. It is to be understood, however, that when the unit T is in assembly with the unit P or with the units H and P, the truck 169 is not employed.

With the outfit embodying my invention, and as hereinbefore stated, it is possible to use separately each of the units H and P and when required the unit P may also be employed separately. Therefore, the value of the outfit to the farmer is materially increased and especially in connection with large acreage. In the harvesting of grain, the unit H may be employed to harvest the grain beginning say ten days before the grain has fully ripened and as such grain is harvested it is stacked as is well known. When the grain fully ripens, both of the units H and T are employed in the same assembly and the harvesting operation is then continued with the requisite separating of the grain at the time it is cut. When the harvesting has been completed, the unit H is removed and the unit T is employed in connection with the stacks of grain, the assembled units P and T being transported, upon the conclusion of the thrashing of one stack to another stack and so continued until all of the stacks have been thrashed. This method avoids the necessity of transporting by barges or the like the grain to the unit T as is now generally done resulting in the harvesting and thrashing of the field being accomplished with a material reduction in labor costs and also in a considerable less time than would otherwise be required.

It is also to be particularly noted that the unit T may be effectively employed in connection with either or both of the units H and T without requiring a second motor and that the driving connection between the unit P and the unit T is effected with a few number of gears resulting in a material decrease in the manufacturing costs of the units.

From the foregoing description it is thought to be obvious that a combined harvester and thrasher constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. In combination with a power and tractive unit, a bar positioned in advance thereof and extending beyond one side of said unit, means for pivotally connecting said bar with the power and tractive unit for rocking movement transversely of the unit, a thrashing unit positioned at one side of the power and tractive unit, a supporting axle for said thrashing unit, a ground engaging member carried thereby, means for pivotally connecting said axle with the power and tractive unit, means for pivotally connecting the thrashing unit with the bar, and means operable from the power and tractive unit for operating the working parts of the thrashing unit.

2. In combination with a power and tractive unit, a bar positioned in advance thereof and extending beyond one side of said unit, means for pivotally connecting said bar with the power and tractive unit for rocking movement in a vertical direction transversely of the unit, a thrashing unit positioned at one side of the power and tractive unit, a supporting axle for said thrashing unit, a ground engaging member carried thereby, means for pivotally connecting said axle with the power and tractive unit, means for pivotally connecting the thrashing unit with the bar, and means operable from the power and tractive unit for operating the working parts of the thrashing unit, said thrashing unit having lateral rocking movement with respect to the axle.

3. In combination with a power and tractive unit, a bar positioned in advance thereof and extending beyond one side of said unit, means for pivotally connecting said bar with the power and tractive unit for rocking movement in a vertical direction transversely of the unit, a thrashing unit positioned at one side of the power and tractive unit, a supporting axle for said thrashing unit, a ground engaging member carried thereby, means for pivotally connecting said axle with the power and tractive unit, means for pivotally connecting the thrashing unit with the bar, means operable from the power and tractive unit for operating the working parts of the thrashing unit, said axle comprising two pivotally connected sections for relative vertical swinging movement, and yieldable means for normally maintaining the sections of the axle substantially in alignment.

4. In combination with a power and tractive unit, a bar positioned in advance thereof and extending beyond one side of said unit, means for pivotally connecting said bar with the power and tractive unit for rocking movement in a vertical direction transversely of the unit, a thrashing unit positioned at one side of the power and tractive unit, a supporting axle for said thrashing unit, a ground engaging member carried thereby, means for pivotally connecting said axle with the power and tractive unit, means for pivotally connecting the thrashing unit with the bar, means operable from the power and tractive unit for operating the working parts of the thrashing unit, and an additional ground engaging member for the thrashing unit having detachable engagement with said unit when the same is separated from the power and tractive unit.

5. The combination with a power and tractive unit, of a harvester structure, a supporting bar, means for mounting said bar horizontally before said unit and for vertical swinging movement, means for supporting the harvester structure on said bar, and means carried by the supporting bar and connected with the harvester whereby the harvester may be oscillated to raise or lower the forward portion thereof.

6. In combination, a power and tractive unit, a harvester unit, means for coupling the harvester unit with the power and tractive unit whereby the same will be supported forwardly of the power and tractive unit and adapted to swing transversely of the path of travel of the same, a frame structure rigidly mounted upon said coupling means, sprocket elements carried by said frame structure, an oscillatory shaft, a sprocket carried upon said shaft, a sprocket chain trained about said sprockets and secured at one end to the harvester structure and at the other end to the shaft supported sprocket, and means operable from the power and tractive unit to oscillate said shaft to effect raising or lowering of the forward portion of the harvester through the medium of said sprocket chain.

7. In combination with a power and tractive unit, a bar member designed to be positioned in advance of the unit and to extend transversely of the same beyond each side thereof, means for pivotally coupling the bar with the unit to permit relative movement between the bar and unit transversely of the path of travel of the unit, means for coupling a harvester unit to said bar in parallel relation therewith and to be supported thereby, and means whereby another unit may be coupled to one end of the bar to be drawn thereby, said last mentioned coupling means being pivotal to permit vertical movement of the bar end.

8. In combination with a power and tractive unit, a frame structure carried thereby and projecting forwardly therefrom, a yoke carried by said frame, a bar member extending through and pivotally secured adjacent one end in said yoke, a caster wheel attached to said bar adjacent the other end thereof, a harvester unit adjustably supported by and forwardly of the bar, an operating mechanism for the harvester unit carried by the bar, means for operating said mechanism from the power unit, and means carried on the power and tractive unit and connected with the harvester unit for shifting the same to working position.

9. The combination with a power and tractive unit, of a harvester structure, a hitch carried forwardly of the unit, a supporting bar mounted transversely of the unit and pivotally carried by said hitch, bracket structures carried by said bar, a frame structure carried by the harvester, means for establishing a sliding connection between the harvester carried frame and said bar, means connecting the harvester and frame carried thereby with the first mentioned brackets whereby vertical adjustment of the harvester may be effected, a grain reel forming a part of the harvester structure, and means connecting the reel with the harvester carried bracket whereby the reel may be adjusted relative to the associated parts of the harvester.

10. The combination with a power and tractive unit, of a harvester including a cutting mechanism, a conveyor arranged rearwardly of the mechanism and a reel overlying the mechanism, a hitching yoke carried by the unit and adjustably pivotally attached to the yoke, guide yokes carried by the supporting bar each housing a friction roller, supporting brackets each comprising a horizontal and a vertical arm and having the horizontal arms attached to the harvester unit and the vertical arms extended through the guide yokes in contact with the friction rollers, bracket members carried by said supporting bar, flexible means connecting the harvester unit with the upright bracket arms and supported by the bar carried brackets, means for shifting said flexible elements to shift the harvester unit vertically, and resilient elements connecting the harvester attached brackets with the supporting bar for the resilient support of the harvester structure.

11. The combination with a power and tractive unit, of a supporting structure carried forwardly of the unit, brackets each including a vertical and a horizontal arm, means for maintaining a shiftable connection between the vertical arms of the brackets and the supporting structure, a cutting mechanism supported upon the horizontal bracket arms, means for vertically shifting the brackets and cutting mechanism supported thereby, a shaft supported by the vertical bracket arms, cranks connected to said shafts, a reel overlying the cutting mechanism, arms supporting said reel and having pivotal support intermediate their ends, links connecting said cranks with said arms and means for oscillating the shafts for the raising and lowering of the reel.

12. The combination with a power and tractive unit of a supporting structure carried forwardly of the unit, a cutting mechanism vertically adjustably carried by the supporting structure, including a pair of upright arms, a shaft carried by said arms longitudinally of the cutting mechanism, oscillatably supported arms projecting forwardly of the mechanism and having crank connection at the rear ends with said shaft, a power driven reel rotatably mounted between the forward ends of the arms over the cutter mechanism, comprising a central shaft, radial arms extending from the shaft at each end thereof, slats swingingly supported longitudinally of the shaft between said arms, and means operating to hold the slats against swinging movement when the same are in lowermost position while passing over the cutting mechanism.

13. The combination with a power and tractive unit, of a supporting structure carried forwardly of the unit, a cutting mechanism vertically adjustably carried by the supporting structure, including a pair of upright arms, a shaft carried by said arms longitudinally of the cutting mechanism, oscillatably supported arms projecting forwardly of the mechanism and having crank connection at the rear ends with said shaft, a power driven reel rotatably mounted between the forward ends of the arms over the cutter mechanism, comprising a central shaft, radial arms extending from the shaft at each end thereof, auxilary arms pivotally attached to the outer end of each of said radial arms, slat elements extending longitudinally of the reel and supported by the adjacent auxiliary arms, yieldable members carried by the radial arms and designed to engage and hold the auxiliary arms as the same pass therebetween during a period in the rotation of the reel to hold the slats stationary, and means for releasing the slats from engagement with the yieldable members.

In testimony whereof I hereunto affix my signature.

ANDREW J. CONLEY.